May 23, 1961 H. D. STUART 2,985,835
SHIFT REGISTER CIRCUIT
Filed July 18, 1957
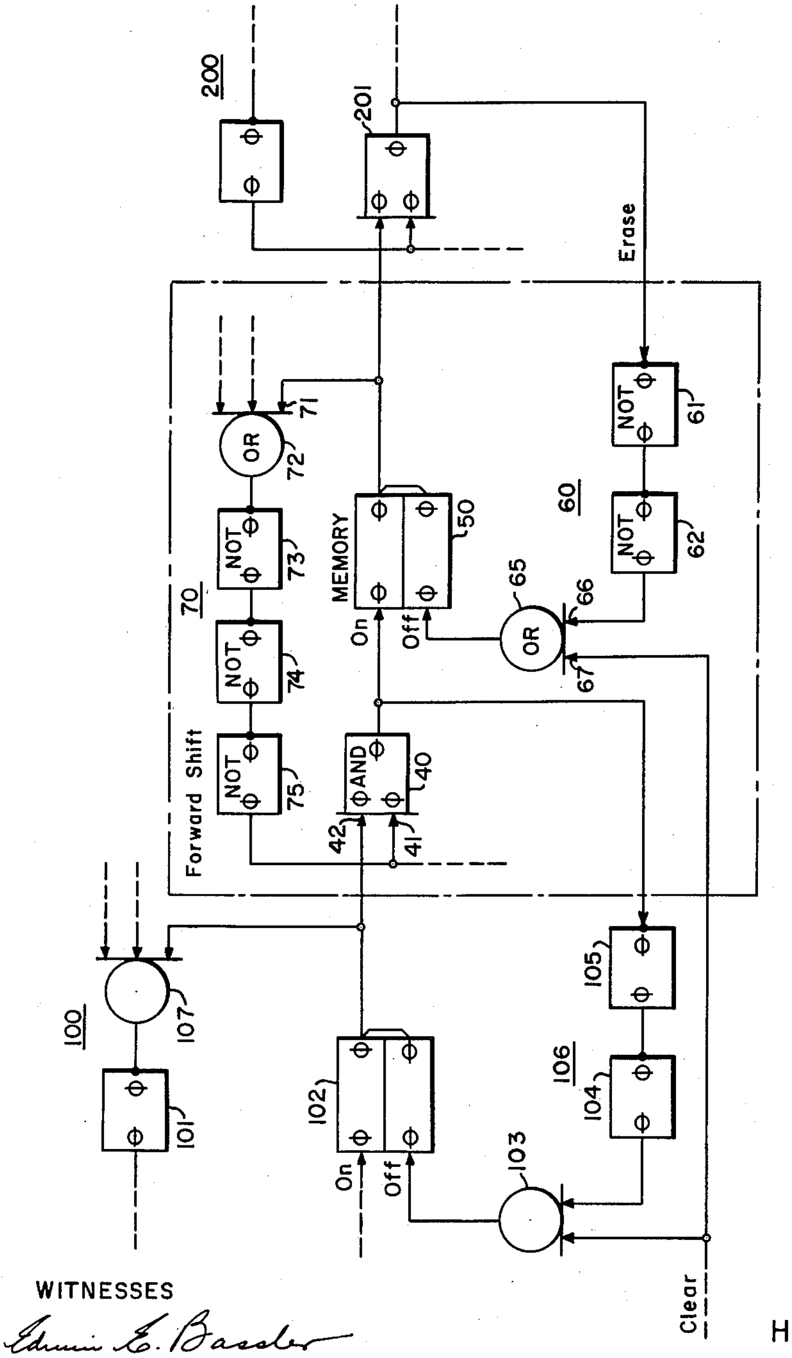
WITNESSES
Edwin E. Bassler
Myron E. Click
INVENTOR
Hugh D. Stuart
BY
F. E. Browder
ATTORNEY United States Patent Office 2,985,835
Patented May 23, 1961

2,985,835

SHIFT REGISTER CIRCUIT

Hugh D. Stuart, Swissvale, Pa., assignor to Westinghouse Electric Corporation, East Pittsburgh, Pa., a corporation of Pennsylvania Filed July 18, 1957, Ser. No. 672,747
10 Claims. (Cl. 328—37)

This invention relates to shift registers in general and in particular to shift register circuits utilizing logic element units.

There are many industrial applications where it is necessary to introduce and store information concerning a work part and then carry this information along in step with the moving work part for action at some later station. This particular type of memory function is usually referred to as a shift register. A shift register, to be completely useful, must also be capable of "erasing behind" as the information is shifted forward. This is necessary to insure that different or unique information for each part in a long string of successive work parts can be carried along without any mixing or blocking of information.

An example of the application of a shift register is in warehouse conveyor control. In large warehouses the distribution of bulky manufactured items is frequently accomplished by a roller-type or overhead conveyor system involving one main line conveyor and side spurs to the various storage and shipping areas. Entrance to each side spur is controlled by a spur switch which shunts the conveyor spur or branch conveyor. As a work part enters the warehouse, an operator directs the work part to the desired spur by encoding information as to which spur the work part will be shunted. This information is placed in the shift register and moves with the work part down the conveyor line until it comes to the proper spur and operates the spur switch.

It is an object of this invention to provide an improved shift register circuit.

It is a further object of this invention to provide an improved shift register circuit wherein a sensing circuit is not necessary to detect the movement of a work part past each station as the shift register carries information about that particular work part forward.

Further objects of this invention will become apparent from the following description when taken in conjunction with the accompanying drawing. In said drawing, for illustrative purposes only, is shown a preferred form of the invention.

The drawing is a schematic diagram of a basic shift register circuit embodying the teachings of this invention.

In general, the apparatus illustrated in the drawing comprises an input means 40, a MEMORY element means 50, erasing circuit means 60, and forward-shift circuit means 70.

The basic circuit is enclosed in the dotted lines in the drawing. The input means 40 comprises an AND logic element means having input terminals 41 and 42. The output of the AND logic element 40 is connected to the "ON" terminal of a MEMORY logic element 50. The output of the AND element 40 is also connected to an erasing circuit 106 of a preceding basic shift register circuit. The output of the MEMORY logic element 50 is connected to an AND logic element 201 of a succeeding basic shift register circuit. The output of the MEMORY logic element 50 is also connected to an input terminal 71 of an OR circuit 72 of the forward-shift circuit 70.

The forward-shift circuit 70 comprises the OR circuit 72, a NOT circuit 73, a NOT circuit 74 and a NOT circuit 75. The output of the OR circuit 72 is connected to the input of the NOT circuit 73. The output of the NOT circuit 73 is connected to the input of the NOT circuit 74. The output of the NOT circuit 74 is connected to the input of the NOT circuit 75. The output of the NOT circuit 75 is connected to the input terminal 41 of the AND logic element 40.

The erasing circuit 60 comprises a NOT circuit 61, a NOT circuit 62 and an OR circuit 65 having two input terminals 66 and 67. The output of the AND circuit 201 of a succeeding basic shift register circuit is connected to the input of the NOT circuit 61 of the erasing circuit 60. The output of the NOT circuit 61 is connected to the input of the NOT circuit 62. The output of the NOT circuit 62 is connected to the input terminal 66 of the OR circuit 65. The output of the OR circuit 65 is connected to the "OFF" terminal of the MEMORY element 50.

Before proceeding with the description of the apparatus illustrated in Fig. 1, it will be necessary to define the components. The MEMORY element 50, as is known to those skilled in the art, comprises a logic element that has two inputs, "ON" and "OFF," and an output. The MEMORY element 50 is a bistable device having two output states which can be considered ON and OFF. Both the "ON" and the "OFF" states are distinguishable voltage signals. The "ON" state can be used to signify the binary digit one and the "OFF" state, the binary digit zero. The MEMORY element 50 will produce an output after a signal is received at the "ON" input. With a single "ON" pulse of the proper magnitude, the MEMORY element 50 will continue to produce an output until a signal is received at the "OFF" input, at that time the MEMORY element 50 will cease delivering an output and will remain "OFF" until an "ON" input signal is received.

The AND logic element 40 produces an output only when all of the plurality of inputs is present. In this case, when inputs are present at both the input terminals 41 and 42, there will be an output from the AND logic element 40. An OR circuit produces an output when any one of a plurality of inputs are present. A NOT circuit produces an output unless there is an input signal present. The NOT circuit will not have an output as long as the input signal is present.

In operation, when a binary digit is stored in the basic shift register circuit, that is, when the MEMORY element 50 is producing an output, that output will activate the forward-shift circuit 70. The output of the MEMORY element 50 will appear at the input terminal 71 of the OR circuit 72 and thus will appear at the input terminal of the NOT element 73. When the input signal is present at the input terminal 73, there is no output signal to the NOT circuit 74. Therefore, the NOT circuit 74 is producing an output to the NOT circuit 75 which, in turn, means that the NOT circuit 75 is not producing an output to the input terminal 41 of the AND element 40. Therefore, when a binary digit is applied to the AND logic element 40 from either a preceding basic shift register circuit, such as from the MEMORY element 102, or is being encoded into the basic shift register circuit by an encoder, if there is a binary digit already stored in the basic shift register circuit illustrated in the drawing, the output of the MEMORY element 50 will prevent there being an input at the input terminal 41 of the AND element 40. Therefore, all of the inputs cannot be present for the AND element 40 and it cannot produce an output to the MEMORY element 50. Thus a binary digit cannot be shifted into the basic shift register circuit if a binary digit is already stored.

If no information is stored in the MEMORY element 50, it will not be producing an output to the terminal 71 of the OR circuit 72 of the forward-shift circuit 70. Therefore, the NOT circuit 73 will not have an input and will be producing an output to the NOT circuit 75. The NOT circuit 75 will then be producing an output to the input terminal 41 of the AND element 40. Therefore, a bit of information or a binary digit may be introduced into the basic shift register circuit illustrated in the drawing.

Under the proper conditions the information stored in the MEMORY element 50 will be shifted to the next succeeeding basic shift register circuit through the input AND logic element 201. The AND element 201 will therefore have an output, a portion of which is fed to the input of the NOT circuit 61 of the erasing circuit 60. The NOT circuit 61 will therefore not have an output and the NOT circuit 62 will produce an output to the terminal 66 of the OR circuit 65. The OR circuit 65 will produce an output to the "OFF" terminal of the MEMORY element 50 turning the MEMORY element 50 off. If the information stored in a shift register is being read out by a decoder rather than into a succeeding shift register circuit, provision may be made in the same manner for activitating the erasing circuit 60.

The logic elements in the apparatus illustrated in the drawing have been shown with outputs and inputs of two phases, $\phi$ and $\theta$, that is a $\phi$ output is 180° out of phase with the $\theta$ output. However, logic elements may be used which have outputs of and are sensitive to inputs of a predetermined voltage level and a substantially zero voltage level, rather than being phase sensitive. If such logic elements are used, then the number of NOT circuits in the forward-shift circuit 70 may be reduced to one.

Two modifications in the forward-shift circuit 70 and the erasing circuit 60 are as follows. When using the phase sensitive type of logic elements it will be noted that the NOT circuits 74 and 75 may be omitted from the forward-shift circuit 70 and both NOT circuits 61 and 62 may be omitted from the erasing circuit 60 and proper phase output will still be incorporated in the system. However, this will depend upon the speed of response in the various logic elements. If the speed of response is too fast, then suitable time delays may be used in place of the above-omitted NOT circuits in the circuits 60 and 70. If single-pulse logic elements are used, then the time delay circuits may be omitted also.

The basic shift register circuit illustrated in the drawing may be connected in series with a plurality of other basic shift register circuits for a required number of positions that a work part may occupy, e.g. along a conveyor. A number of shift registers made up of the basic shift register circuits may be paralleled to carry the requisite number of binary digits which completely encodes the information required about a particular work part. The manner of placing the basic shift register circuit in series is shown in the drawing where portions of preceding and succeeding basic shift register circuits are shown. A MEMORY element 102 of a preceding basic shift register circuit will be connected to the input terminal 42 of the AND element 40. The output of the MEMORY element 102 will be connected to an input of an OR circuit 107 of a forward-shift circuit 100 for the preceding basic shift register circuit. An erasing circuit 106 for the preceding basic shift register circuit comprising a NOT circuit 105, a NOT circuit 104 and an OR circuit 103 is shown connected to the output of the AND element 40. As is shown in the drawing, the output of the MEMORY element 50 may be connected to an input AND element 201 of a succeeding basic shift register circuit. The input AND element 201 is shown to be receiving an input from its own individual forward-shift circuit 200.

Information is stored in the shift register in binary fashion. Thus either one of two different codes, one or zero, can be stored in one shift register; any one of four codes in two parallel registers; any one of eight codes in three parallel registers; 16 different codes in four registers, and so forth. Provision is made by the OR circuit 72 of the forward-shift circuit 70 for additional inputs. These inputs will be derived from the outputs of MEMORY elements connected in the manner of the MEMORY element 50 for other basic shift register circuits connected in parallel with the basic shift register circuit illustrated in the drawing. The output of the forward-shift circuit 70 will therefore serve all of the basic shift register circuits by connecting the output of the circuit 70 to one input of each input AND logic element in each of the basic shift register circuits which are paralleled with the shift register circuit shown in the drawing.

The purpose of the forward-shift circuit 70 is to prevent information being shifted into the basic shift register circuit if a binary digit is already stored there. Therefore, if a binary digit is stored in any one of the plurality of circuits in parallel, there will be an output to one of the plurality of inputs of the OR circuit 72 thereby preventing the shifting of information from preceding basic shift register circuits or from an encoder. If there are no binary digits stored in any one of the paralleled basic shift register circuits, there will be no output to any of the plurality of inputs of OR circuit 72 of the forward-shift circuit 70 and a binary digit may be shifted from a preceding stage into any one of the plurality of basic shift register circuits which are in parallel and controlled by the forward-shift circuit 70.

The information stored in the shift register built from the basic shift register circuit illustrated in the drawing will not be required to wait for the work part to pass a photoelectric cell or a similar sensing means in order to shift forward. If there is no information stored in the shift register circuit, the information introduced at the beginning will shift clear through the shift register to a point where action is required because of the information encoded. As the information shifts through the shift register, it will erase behind as it goes, as discussed above. There can be no mixing of the information because of the sensing propensities of the forward-shift circuit 70.

A signal applied to the "clear" conductor which is connected to the input terminal 67 of the "OR" circuit 65 of the erasing circuit 60 will pass through the "OR" circuit 65 and turn the MEMORY element means 50 "OFF." This "clear" conductor may be connected to an "OR" circuit of an erasing circuit of each basic shift register circuit employed in a shift register system. Thus by applying a signal to the "clear" conductor the whole shift register system may be cleared of any information stored therein.

In conclusion, it is pointed out that while the illustrated example constitutes a practical embodiment of my invention, I do not limit myself to the exact details shown, since modification of the same may be varied without departing from the spirit of this invention.

I claim as my invention:

1. In a basic shift register circuit, in combination, input means, MEMORY element means having ON and OFF terminals, erasing circuit means and forward-shift circuit means, said input means comprising an AND logic element having two inputs and an output, said erasing circuit means comprising two NOT logic elements serially connected together, said forward-shift circuit means comprising a non-phase sensitive NOT logic element, the output of said AND logic element being connected to an ON terminal of said MEMORY element means, the output of said MEMORY element means being connected to an input of said forward-shift circuit means, circuit means for connecting the output from said MEMORY element to said erasing circuit means, the output of said erasing circuit means being connected to an OFF terminal of said MEMORY element means, the output of said forward-shift circuit means being connected to one of said inputs of said AND logic element.

2. In a basic shift register circuit, in combination, input means, MEMORY element means having ON and OFF terminals, erasing circuit means and forward-shift circuit means, said input means comprising an AND logic element having two inputs and an output, said erasing circuit means comprising two NOT logic elements serially connected together, said forward-shift circuit means comprising three phase sensitive NOT logic elements serially connected together, the output of said AND logic element being connected to an ON terminal of said MEMORY element means, the output of said MEMORY element means being connected to an input of said forward-shift circuit means, circuit means for connecting the output from said MEMORY element to said erasing circuit means, the output of said erasing circuit means being connected to an OFF terminal of said MEMORY element means, the output of said forward-shift circuit means being connected to one of said inputs of said AND logic element.

3. In a shift register, in combination, a plurality of basic shift register circuits, each of said basic shift register circuits comprising input means, MEMORY element means having ON and OFF terminals, erasing circuit means and forward-shift circuit means, said input means comprising an AND logic element having two inputs and an output, said erasing circuit means comprising two NOT logic elements serially connected together, said forward-shift circuit means comprising three phase sensitive NOT logic elements serially connected together, the output of said AND logic element being connected to an ON terminal of said MEMORY element means, the output of said MEMORY element means being connected to the input of said forward-shift circuit means, circuit means for connecting the output from said MEMORY element to said erasing circuit means, the output of said erasing circuit means being connected to an OFF terminal of said MEMORY element means, the output of said forward-shift circuit means being connected to one of said inputs of said AND logic element.

4. In a shift register, in combination, a plurality of basic shift register circuits, each of said basic shift register circuits comprising input means, MEMORY element means having ON and OFF terminals, erasing circuit means and forward-shift circuit means, said input means comprising an AND logic element having two inputs and an output, said erasing circuit means comprising two NOT logic elements serially connected together, said forward-shift circuit means comprising three phase sensitive NOT logic elements serially connected together, the output of said AND logic element being connected to an ON terminal of said MEMORY element means, the output of said AND logic element also being connected to an input of an erasing circuit of a preceding basic shift register circuit, the output of said MEMORY element means being connected to an input of said forward-shift circuit means, the output of said erasing circuit means being connected to an OFF terminal of said MEMORY element means, the output of said forward-shift circuit means being connected to one of said inputs of said AND logic element.

5. In a shift register, in combination, a plurality of basic shift register circuits, each of said basic shift register circuits comprising input means, MEMORY element means having ON and OFF terminals, erasing circuit means and forward-shift circuit means, said input means comprising an AND logic element having two inputs and an output, said erasing circuit means comprising two NOT logic elements serially connected together, said forward-shift circuit means comprising three phase sensitive NOT logic elements serially connected together, the output of said AND logic element being connected to an ON terminal of said MEMORY element means, the output of said AND logic element also being connected to an input of an erasing circuit of a preceding basic shift register circuit, the output of said MEMORY element means being connected to an input of said forward-shift circuit means, the output of said MEMORY element means also being connected to an input means of a succeeding basic shift register circuit, the output of said erasing circuit means being connected to an OFF terminal of said MEMORY element means, the output of said forward-shift circuit means being connected to one of said inputs of said AND logic element.

6. In a shift register, in combination, a plurality of basic shift register circuits, each of said basic shift register circuits comprising input means, MEMORY element means having ON and OFF terminals, erasing circuit means and forward-shift circuit means, said input means comprising an AND logic element having two inputs and an output, said erasing circuit means comprising two NOT logic elements and an OR logic element serially connected together, said OR logic element having a plurality of inputs, said forward-shift circuit means comprising three phase sensitive NOT logic elements serially connected together, the output of said AND logic element being connected to an ON terminal of said MEMORY element means, the output of said AND logic element also being connected to an input of an erasing circuit of a preceding basic shift register circuit, the output of said MEMORY element means being connected to an input of said forward-shift circuit means, the output of said MEMORY element means also being connected to an input means of a succeeding basic shift register circuit, the output of said erasing circuit means being connected to an OFF terminal of said MEMORY element means, the output of said forward-shift circuit means being connected to one of said inputs of said AND logic element.

7. In a shift register, in combination, a plurality of basic shift register circuits, each of said basic shift register circuits comprising input means, MEMORY element means having ON and OFF terminals, erasing circuit means and forward-shift circuit means, said input means comprising an AND logic element having two inputs and an output, said erasing circuit means comprising two NOT logic elements and a first OR logic element serially connected together, said first OR logic element having a plurality of inputs, said forward-shift circuit means comprising three phase sensitive NOT logic elements and a second OR logic element serially connected together, said second OR logic element having a plurality of inputs, the output of said AND logic element being connected to an ON terminal of said MEMORY element means, the output of said AND logic element also being connected to an input of an erasing circuit of a preceding basic shift register circuit, the output of said MEMORY element means being connected to an input of said forward-shift circuit means, the output of said MEMORY element means also being connected to an input means of a succeeding basic shift register circuit, the output of said erasing circuit means being connected to an OFF terminal of said MEMORY element means, the output of said forward-shift circuit means being connected to one of said inputs of said AND logic element.

8. In a shift register, in combination, a plurality of basic shift register circuits, each of said basic shift register circuits comprising input means, MEMORY element means having ON and OFF terminals, erasing circuit means and forward-shift circuit means, said input means comprising an AND logic element having two inputs and an output, said erasing circuit means comprising two NOT logic elements and a first OR logic element serially connected together, said first OR logic element having a plurality of inputs, said forward-shift circuit means comprising three phase sensitive NOT logic elements and a second OR logic element serially connected together, said second OR logic element having a plurality of inputs, the output of said AND logic element being connected to an ON terminal of said MEMORY element means, the output of said AND logic element also being connected to an input of an erasing circuit of a preceding basic shift register circuit, the output of said MEMORY element means also being connected to an input means of a succeeding basic shift register circuit, the output of said erasing circuit means being connected to an OFF terminal of said MEMORY element means, the output of said forward-shift circuit means being connected to one of said inputs of each AND logic element of a plurality of parallel basic shift register circuits, and circuit means for connecting the output of each MEMORY element means of a plurality of paralleled basic shift register circuits to said plurality of inputs of said OR logic element of said forward-shift circuit means.

9. In a shift register, in combination, a plurality of basic shift register circuits, each of said basic shift register circuits comprising input means, MEMORY element means having ON and OFF terminals, erasing circuit means and forward-shift circuit means, said input means comprising an AND logic element having two inputs and an output, said erasing circuit means comprising two NOT logic elements and a first OR logic element serially connected together, said first OR logic element having a plurality of inputs, said forward-shift circuit means comprising three phase sensitive NOT logic elements and a second OR logic element serially connected together, said second OR logic element having a plurality of inputs, the output of said AND logic element being connected to an ON terminal of said MEMORY element means, the output of said AND logic element also being connected to an input of an erasing circuit of a preceding basic shift register circuit, the output of said MEMORY element means also being connected to an input means of a succeeding basic shift register circuit, the output of said erasing circuit means being connected to an OFF terminal of said MEMORY element means, the output of said forward-shift circuit means being connected to one of said inputs of each AND logic element of a plurality of paralleled basic shift register circuits, circuit means for connecting the output of each MEMORY element means of a plurality of paralleled basic shift register circuits to said plurality of inputs of said OR logic element of said forward-shift circuit means, and circuit means for applying a clear signal to an input of said OR logic element of said erasing circuit means.

10. In a shift register, in combination, a plurality of basic shift register circuits, each of said basic shift register circuits comprising input means, MEMORY element means having ON and OFF terminals, erasing circuit means and forward-shift circuit means, said input means comprising an AND logic element having two inputs and an output, said erasing circuit means comprising two NOT logic elements serially connected together, said forward-shift circuit means comprising a non-phase sensitive NOT logic element, the output of said AND logic element being connected to an ON terminal of said MEMORY element means, the output of said MEMORY element means being connected to an input of said forward-shift circuit means, circuit means for connecting the output from said MEMORY element to said erasing circuit means, the output of said erasing circuit means being connected to an OFF terminal of said MEMORY element means, the output of said forward-shift circuit means being connected to one of said inputs of said AND logic element.

References Cited in the file of this patent

UNITED STATES PATENTS 2,828,477 Lanning -------------- Mar. 25, 1958

OTHER REFERENCES

Electronics, December 1949, pp. 186, 188, 190 and 192, title, Gate-Type Shifting Register by Knapton and Stevens.